A. H. PITNEY.

MAIL MARKING MACHINE AND POSTAGE METER.

APPLICATION FILED MAR. 26, 1920.

Reissued July 13, 1920.

14,916.

4 SHEETS—SHEET 1.

Witness

Robert F. Beck

Inventor

Arthur H. Pitney

By Alexander Dowell

Attorney

A. H. PITNEY.

MAIL MARKING MACHINE AND POSTAGE METER.

APPLICATION FILED MAR. 26, 1920.

Reissued July 13, 1920.

14,916.

4 SHEETS—SHEET 2.

(A-A)

(E-E')

(B-B)

Witness:
Robert F. Beck

Inventor
Arthur H. Pitney
By Alexander Dowell
Attorneys

A. H. PITNEY.
MAIL MARKING MACHINE AND POSTAGE METER.
APPLICATION FILED MAR. 26, 1920.
Reissued July 13, 1920. 14,916.
4 SHEETS—SHEET 3.
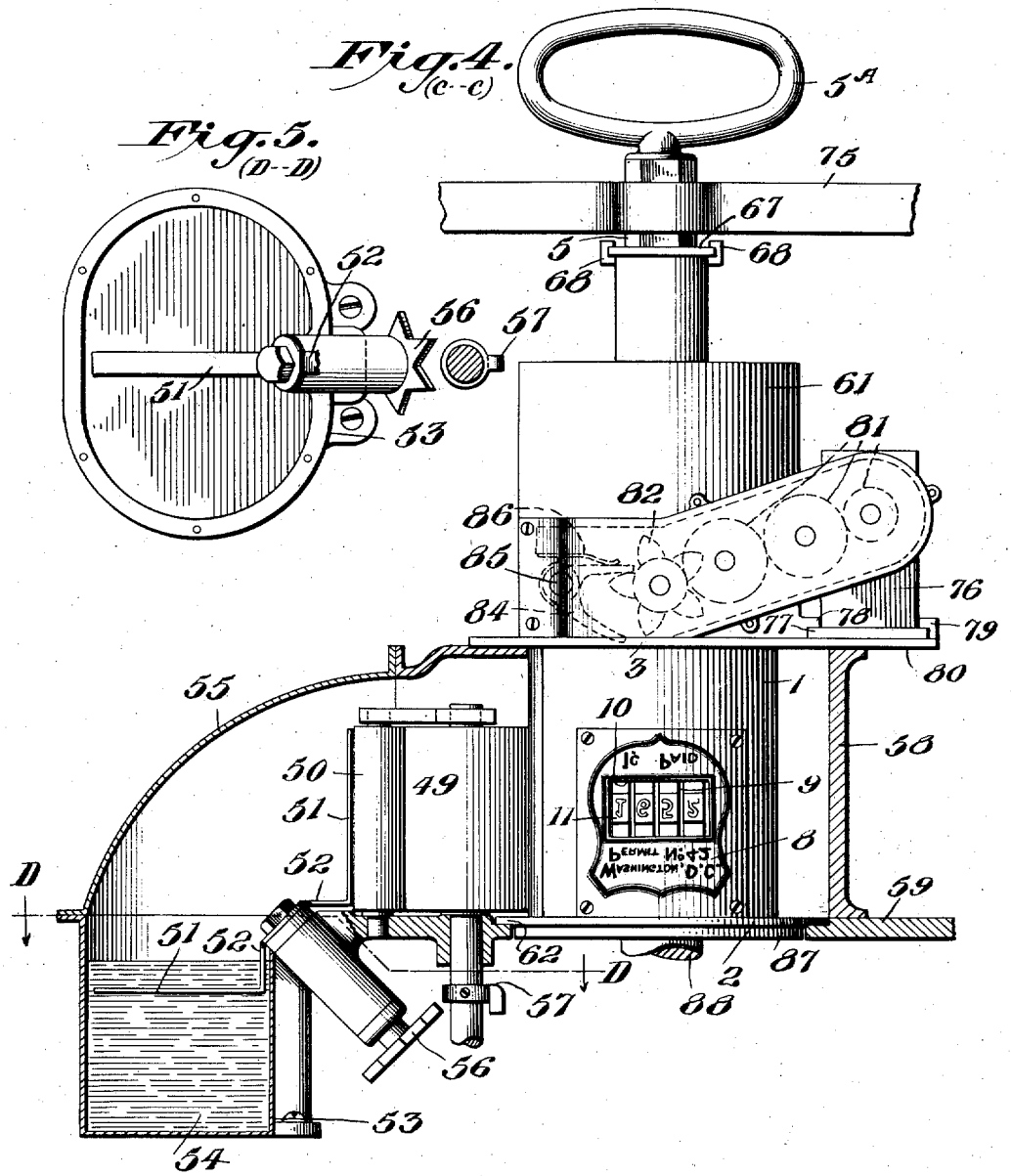
Inventor
Arthur H. Pitney
Witness
Robert F. Beck
By
Alexander Lowe
Attorney

A. H. PITNEY.

MAIL MARKING MACHINE AND POSTAGE METER.

APPLICATION FILED MAR. 26, 1920.

Reissued July 13, 1920. 14,916.

4 SHEETS—SHEET 4.

Inventor

Witness:

Robert F. Beck

Arthur H. Pitney

By Alexander Sowell

Attorneys

UNITED STATES PATENT OFFICE.

ARTHUR H. PITNEY, OF WILMETTE, ILLINOIS, ASSIGNOR TO PITNEY-BOWES POSTAGE METER COMPANY, OF STAMFORD, CONNECTICUT, A CORPORATION OF DELAWARE.

MAIL-MARKING MACHINE AND POSTAGE-METER.

14,916. Specification of Reissued Letters Patent. Reissued July 13, 1920.

Original No. 1,273,793, dated July 23, 1918, Serial No. 721,183, filed September 19, 1912. Application for reissue filed March 26, 1920. Serial No. 369,121.

*To all whom it may concern:*

Be it known that I, ARTHUR H. PITNEY, a citizen of the United States, residing at Wilmette, county of Cook, and State of Illinois, have invented certain new and useful Improvements in Mail-Marking Machines and Postage-Meters; and I hereby declare that the following is a full, clear, and exact description thereof, reference being had to the accompanying drawings, which form part of this specification.

The main objects of this invention are to provide an improved machine for printing or impressing stamps upon envelops, cards, or the like, and of the type shown and described in my prior Patent No. 753,207, issued February 23, 1904; to provide an improved arrangement of a machine of this kind wherein the printing head is securely locked within a casing by itself, so as to leave all other parts of the machine free to access for the purpose of adjustment, repair, and removal; to provide a machine of this kind in which different printing heads are adapted to be interchangeably used; to provide an improved form of rotary printing head which is adapted to be readily removed from the machine; to provide an improved and compact form of housing or casing for the printing head or cylinder, which will permit the same to be readily removed from, and inserted into place and effectually prevent unauthorized tampering therewith; to provide improved means for locking the printing head within the casing; to provide improved means for unlocking the head to permit it to be shifted within the casing into and out of printing position, and to permit it to be shifted into a position to allow access thereto; to provide an improved arrangement of the numbering machine within said head; to provide an improved construction of the numbering machine whereby it may be set for the number of impressions to be made; to provide improved mechanism for operating said numbering machine whereby the movement of the numbering wheels will be such as to decrease the count of the numbering machine and to return to zero; to provide improved means for alining the numbering wheels of the numbering machine and for locking them in alined position during the printing operation; to provide improved means for locking the printing head against further operation after having made the last impression for which the numbering machine was set; to provide improved means for locking the numbering wheels when the printing head is locked; to provide an improved inking system for inking the printing die; and to provide an improved arrangement of the counting device whereby it is shifted into position for being operated when the printing head is in position on said machine and whereby it is shifted out of said operating position when the printing head is removed from the machine.

An illustrative embodiment of this invention is shown in the accompanying drawings in which:

Fig. 4 is a side elevation, partly sectional, of the device as viewed from the plane of the line C—C of Fig. 1.

Fig. 5 is a plan view of the inking system taken on the line D—D of Fig. 4.

Figure 1:
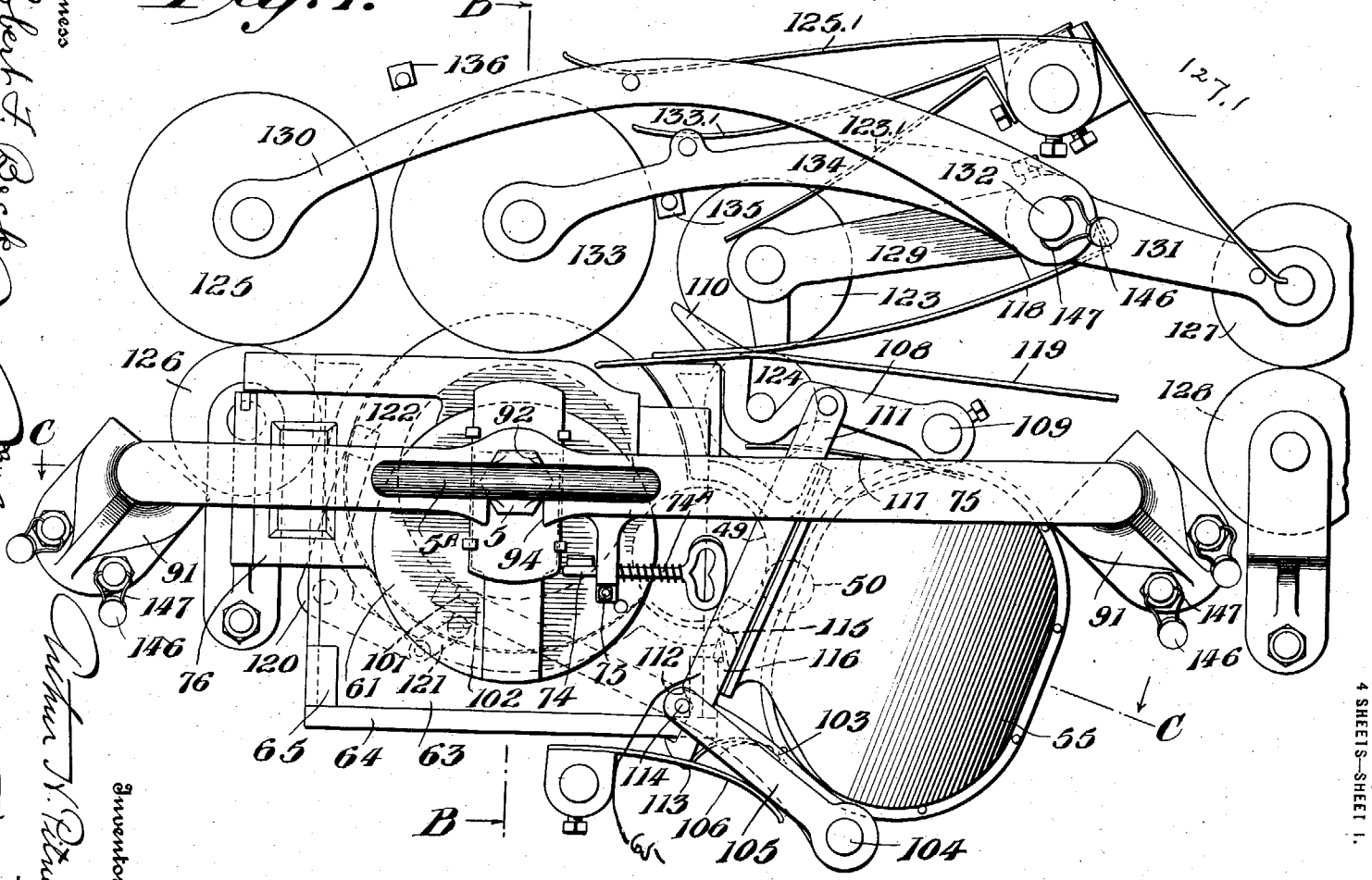
Figure 1 is a partial plan view.

The specific embodiment herein shown and described comprises a rotatable printing member, which is adapted to be supported in position for marking envelops as they are forced along a certain path by means of a system of rollers. The printing member is removable from the printing position for the purpose of interchanging with other printing members, or transportation to the post office for resetting or adjustment. A suitable housing is provided for inclosing the printing member when in the printing position, and a hood is also provided for receiving the member when it is removed from the printing position. Suitable means are provided for locking the printing member in the printing position, or within said hood. The printing member is provided with a number printing machine and suitable mechanism for operating it so that when the printing member is marking envelops each piece of mail is numbered, and after a predetermined number of envelops have been marked the entire apparatus will become locked against further operation until it has been officially reset. Means are provided for operating the printing member as the envelops pass. Further means, also inaccessible to the user, are provided for registering the number of impressions that are made by the device. The device is arranged to occupy the minimum amount of space, to be positively operated at all times, and protected against unauthorized use and malicious tampering.

In the construction shown in the drawings, the rotatable printing member or drum is in the form of a cylindrical shell or casing 1 having an integral bottom 2, and separable top 3 within which all of the parts are housed. The printing member is rotatably suspended, by means of the top 3, on the enlarged head 4 carried on the shaft 5. The cover 3 is provided with a sleeve 6, so as to provide sufficient bearing surface and is retained in position by means of the collar 7. The shell 1 has a printing surface or die 8 concentric with the axis of the shaft, and secured to the exterior of the casing, and upon which is cast the desired insignia that is to be impressed upon the envelops. A number printing machine 9 is arranged within the shell 1, below the end of the shaft 5 and has a row of numbers exposed through the opening 10 of the die 8 which form a part of the printing surface.

The numbering machine 9 comprises a plurality of numbering wheels 11, there being four shown in the present construction, loosely mounted on the block 12 which is rigidly secured to the frame 13 by means not shown, and serves as bearing for the numbering wheels and also for the operating shaft 14. The numbering wheels 11 have raised figures, and are of such form that the part protruding through the opening in the die 8 is concentric with the axis of the shaft 5 and exactly conforms with the printing surface of the die 8. As is usual in devices of this class, the numbering wheels are operated by a reciprocating lever 15 keyed to the shaft 14 and the usual pawl 16, which is pivotally mounted at its opposite ends to the lever 15, and the arm 15[a] keyed to the other end of the shaft 14. The pawl 16 is normally urged by the usual spring (not shown) to coact with the shallow notches 17 and deep notches 18 for revolving the wheels for the purpose of operating the numbering wheels. The usual spring pressed pawl 19 prevents the wheels from turning backward. This numbering machine differs from the usual device of this class in that the numerals are arranged on the wheels so that as said wheels are rotated the numerals appear in the printing position in the inverse order whereby the count is decreased by unity for each successive reciprocation of the lever 15, the purpose of which will be hereinafter fully explained.

Figure 2:
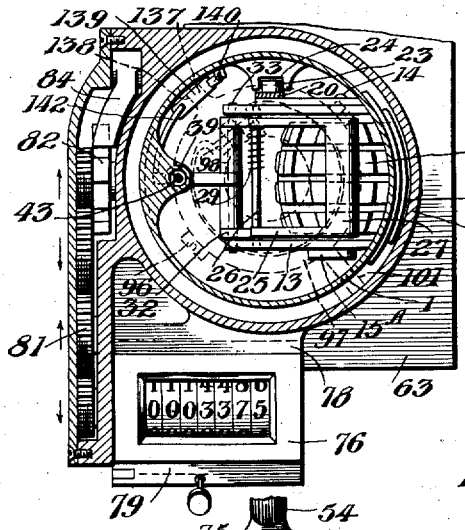
Fig. 2 is a sectional plan view of the printing drum and hood taken on the line A—A of Fig. 3.
Figure 14:
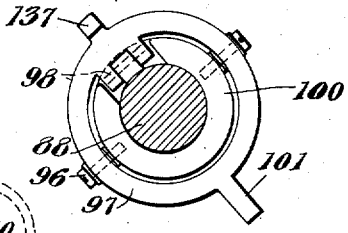
Fig. 14 is a sectional detail taken on the line E—E of Fig. 3 and showing the clutch operating lever.

The lever 15 is connected to a link 20 which carries a roller 21 at its upper end, traveling in the cam slot 22 formed in the head 4. The link 20 is provided with a second roller 23 (Fig. 2), which travels in a vertical slot 24 formed in a projection on the shell 1. The roller 23 and vertical cam slot 24 prevent any but a vertical movement of the link 20, and thereby insures the proper action of the lever 15.

Mechanism is provided for alining the numbers on the several numbering wheels 11, and for locking them in alined position when passing the printing position. This mechanism is in the form of a lever 25, pivotally mounted on a shaft 26 supported in the frame 13, and provided with a plurality of wedge shaped prongs 27 which are adapted to engage the V-shaped notches 28 formed in the numbering wheels 11 between the raised numbers thereon. The lever 25 is normally urged by the spring 29 out of the path of the numbering wheels 11, and just before the die 8 enters upon the printing operation the lever 25 engages a spring 30, secured to the under part of the head 4, which depresses the pawl so as to cause the wedge shaped prongs 27 to enter the notches 28 and bring all the numbers on the numbering wheels 11 to an alined position. A shoulder 31, located behind the spring 30, prevents the lever 25 from yielding as the die is passing the printing position, and thereby makes it impossible for any one to change the count of the wheels of the numbering machine when the drum is in the printing position.

After the printing member has made a predetermined number of impressions, for which the numbering machine was set, mechanism is released and operated for locking the numbering machine and the printing member against further operation until the printing member is removed and the numbering wheels reset.

The locking mechanism for the numbering machine comprises a pawl 32 pivotally mounted on the rod 33 supported in the frame 13 at the rear of the numbering wheels. The upper end of the pawl is provided with a plurality of prongs 34, which are normally urged by the spring 35 to bear upon the peripheries of the disks or rings 36 secured to the right of the numbering wheels 11. The disks or rings 36 are less in diameter than the printing peripheries of the wheels 11, and are provided with notches or recesses 37 so located that they will be brought into the same relative position as said prongs 34 when the wheels are shifted after having made the last impression for which the numbering machine was set. When the notches 37 are brought into said position, the prongs 34 enter therein and secure the wheels against further rotation.

Coacting with the locking mechanism just described, is the locking mechanism for securing the head against further rotation, which comprises a bolt 38 slidably mounted in a bore 39 and normally urged by the spring 40 into the path of the recess 41 formed in the flange 42 on the head 4. A rod 43 is carried by the bolt 38 and has a shoulder 44 formed thereon near the lower end, which is adapted to be engaged and held depressed by the detent or hook 45, rigidly carried on the pawl 32, when the prongs 34 of the pawl 32 bear on the peripheries of the disks 36. A pin 46 is secured to the bolt 38 and extends through a slot 47 in the shell 1, and which is adapted to be used in depressing the bolt 38 against the action of the spring 40 for the purpose of resetting the numbering machine. The pawl 32 is provided with an extension 48, which extends in the path of the rod 43 and which is engaged thereby for forcing the prongs 34 out of the recesses 37, when the bolt 38 is depressed, so as to allow the resetting of the numbering wheels.

The inking mechanism for supplying ink to the printing surface on the printing member includes a roller 49 located at the right hand side of the printing member and positively driven at the same peripheral speed as the printing member, so as to properly ink said printing surface. Ink is evenly distributed over the surface of the roller 49 by means of an idler 50, mounted on a parallel axis and of considerably less diameter so that it makes several revolutions to one revolution of the roller 49. Ink is supplied to the idler 50 by means of blades or swabs 51 disposed at substantially right angles to each other and carried by the member 52 rotatably mounted on an axis disposed at substantially 45 degrees with respect to the vertical. The blades 51 are, of course, suitably formed and constructed to carry the proper amount of ink, depending on the character of ink. A tank 53 is arranged in the path of the blades 51, and filled with a sufficient quantity of ink 54 to allow the blades 51 to become immersed therein during a part of their travel. A casing 55 incloses the path of the blades 51, so as to protect the surrounding parts of the machine from being spattered with ink. The member 52 is rotated through the action of the star wheel 56 connected thereto, and the pin or shoulder 57 carried by the shaft on which the ink roller 49 is carried.

A casing or shell 58 of substantially cylindrical construction forms a housing for the rotary printing member when it is in its printing position. The housing, of course, terminates adjacent to the path of the envelops, thereby providing an opening for allowing the printing surface of the printing member to engage the passing envelops.

The casing also extends out around the ink roller 49. The housing 58 is supported on and rigidly secured to the platform 59 by means of bolts 60.

A casing or hood 61 is carried by the shaft 5, and designed to receive the printing member for securely housing it when it is removed from the machine. This hood is of cylindrical form, preferably cast in one piece the bottom thereof being closed by the base 2 and integral flange 62 when the printing member is inclosed therein. The hood 61 has a transversely disposed rectangular flange 63 formed at the lower end thereof, which supports the hood on the housing 58 when the printing member is shifted into its printing position. When the printing member is in the printing position it is necessary for the hood 61 to be shifted in a transverse direction in order to remove the front thereof out of the path of the envelops. The housing 58 is, therefore, provided with a transversely disposed flange 64 for supporting the flange 63, and at its rear corners is provided with shoulders 65 which engage the edges of the flange 63 when shifted rearwardly, and thereby secure the hood and printing member in their respective positions. In order to permit the shifting of the hood 61, it is provided with an elongated slot 66 through which the shaft 5 extends, and which is covered by a slide 67 embracing the shaft 5 and slidably supported on the hood 61 by the shoulders 68.

Locking means are provided for securing the printing member within the hood, being illustrated more or less diagrammatically, for the sake of simplicity. In the form shown this includes a bolt 69 slidably mounted in the upper end of the hood 61, and normally urged by the spring 70 to bear against the shaft 5. The shaft 5 is provided with a notch or recess 71, so located that when the printing member is entirely within the hood 61 it will be in a position to receive the bolt 69. A key hole 72 is formed in the hood 61 into which a key is adapted to be inserted and is so located that the bit of the key will engage the shoulder 73 on the bolt and permit the bolt to be retracted from engagement with the recess 71 whereby the printing member is free to be shifted out of the hood. In the drawings a key 74 is shown secured to the bar 75, and arranged so that when the hood is set in position to allow the printing member to be shifted into the housing 58 the key may be inserted into the keyhole 72 and turned for the purpose of retracting the bolt 69. A spring 74[a] embraces the key 74 and normally urges it into a retracted position, as shown in Fig. 1. It is also intended that a duplicate or master key will be in the possession of proper officials at the post office, whereby the printing member may be unlocked and shifted out of the hood when it is removed from the machine for the purpose of adjusting the mechanism of the printing member.

A registering machine 76 is mounted on the hood 61, the same having flanges 77 along both edges thereof, the inner flange being received under the shoulder 78 and the outer flange being engaged under the bar 79 pivotally connected at one end to the extension 80 of the flange 63. The register is connected by a train of gears 81 to a star wheel 82 located at the front part of the hood 61. The star wheel is operated by the shoulder 83 suitably positioned on the top 3 of the printing member, so as to engage the wheel after each printing operation has been completed. The star wheel is brought into the path of the shoulder 83 only when the hood 61 is shifted to the rear of the machine for the purpose of removing it from the path of the envelops. An escapement 84, pivotally mounted on a shaft 85 and normally urged by the spring 86 into the position shown in Fig. 4, prevents the reverse operation of the star wheel.

When in its printing position, the printing member is supported on a rotatable base member 87 carried on the shaft 88, the bottom 2 of the printing member being provided with a central stud 89 and the pins 90 adapted to engage suitable notches in the base 87 whereby the parts are rotatably connected together. The pins 90 are preferably located out of a diametrically opposed relation, so that there can be but one position in which the printing member and base can be operatively connected together.

The shaft 5 is supported in its vertically disposed position by means of the bar 75 supported above the base 59 by the integral standards 91. The shaft 5 is preferably of polygonal cross section, being herein shown hexagonal, and the bar 75 is provided with a notch 92 of substantially the same size and shape as the shaft 5. Thus, when the shaft 5 is in the notch 92, the corners of the shaft and the notch constitute coacting shoulders which secure the shaft against dislodgment. The shaft 5 is provided with grooves 93 which reduce the thickness thereof locally, and which are located to register with the bar 75 when the printing member is drawn into the hood 61 and permit the shaft to be removed from the notch 92 through the opening 94. A handle 5[a] is detachably secured to the shaft 5, which is used for shifting of the printing member into and out of the hood 61 and for carrying them.

The rotation of the base 87, and consequently that of the printing member, is obtained through the medium of a shiftable clutch member 95 which is adapted to coact with a continuously rotating clutch member (not shown). The clutch member 95 is pivotally connected at 96 to the lever 97, which is in the form of a ring surrounding the shaft 88 and pivotally connected thereto at 98. A spring 99 embraces the shaft 88 below the base 87, and bears on the collar 100 of the clutch 95 and urges the clutch into its engaging position with the other clutch member. The clutch member 95 is held in a retracted position through the engagement of a lug or shoulder 101 with the inclined end and shoulder 102 of the arm 103.

The arm 103 is rigidly secured to a shaft 104 at its lower end which carries the arm 105, rigidly connected thereto at its upper end, against which the spring 106 bears for normally urging the arm 103 into position to bring the shoulder 102 into the path of the lug 101. The arm 103 is provided with a spring pressed detent 107, which engages the rear edge of the lug 101, and thereby coacts with the shoulder 102 for securing the printing member against rotation in either direction when the clutch member has been lifted.

The arm 103 is shifted to disengage the shoulder from the lug 101 by the passage of envelops past a certain point in their line of travel. This mechanism includes a finger 108 mounted on the shaft 109, and having the end 110 extending across the path of the envelops. A link 111 is connected to the finger 108, and has a shoulder 112 normally urged by the spring 113 to bear against the pin or shoulder 114 on the under side of the arm 105, so that a movement of the finger 108 shifts the arm 105 thereby rotating the shaft 104 and shifting the arm 103 away from the lug 101. The movement of the arm 103 needs to be only sufficient to disengage the lug 101, and the link 111 is, therefore, provided with an inclined shoulder 115 on its under face which engages the shoulder or lug 116 on the flange 64 of the housing 58, when the link 111 has moved a sufficient distance to shift the arm 105 to accomplish the necessary movement of the arm 103. The engagement of the shoulders 115 and 116 causes the shoulder 112 to be shifted out of engagement with the pin 114, and allows the arm 103 to return to its normal position, so as to bring the inclined end and shoulder 102 into the path of the lug 101.

The finger 108 is urged into the path of the envelops by a spring 117. Guide plates 118 and 119 (Fig. 1) are arranged on opposite sides of the path of the envelops, and converge toward each other and abut adjacent to the point where the finger 108 crosses the path of the envelops. These plates are for the purpose of insuring the proper movement of the finger 108 as an envelop is passing.

In order to insure against the possibility of the printing drum making more than one revolution, in case the arm 103 should be held out of the path of the lug 101, an auxiliary stopping means is provided. This includes a bell-crank lever 120, pivotally mounted on the frame 69 and connected by a link 121 to the arm 103. The opposite end of the lever 120 is inclined and provided with a shoulder 122, which is shifted into the path of the lug 101 when the lever 103 is shifted out of the path. If for any reason the arm 103 should be held retracted, the printing member will not be able to complete its revolution for the reason that the lug 101 will engage the incline at the end of the lever 120 and be lifted thereby, and further rotation of the member will be stopped by the shoulder 122.

A plurality of rollers are arranged, so as to cause envelops to move along a certain path adjacent to which the printing drum, and other mechanism just described, are located. These rollers include the rollers 123 and 124, located at the right hand side of the printing member, and the rollers 125 and 126, located at the left hand side of the printing member. A third pair of rollers 127 and 128 are located at the right of the rollers 123 and 124, which direct the envelops in between the guide plates 118 and 119. The rollers 124, 126, and 128 are rigidly supported on the base plate 59 of the machine, and the rollers 123, 125, and 127 are rotatably mounted in the respective arms or frames 129, 130, and 131, pivotally supported on the shaft 132. The shiftable rollers are normally urged against the stationary rollers by means of suitable springs 123.1, 125.1, 127.1 shown in Fig. 1. A platen roller 133 carried in the frame 134, mounted on the shaft 132, is normally urged by a spring 133.1 into position to press the envelops against the printing surface of the printing member. A lug 135 limits the inward movement of the frame 134, and a lug 136 limits the position to which the frame 130 can be shifted when in its normal position on the machine. All of the rollers are connected by suitable gearing, so as to be positively driven at the proper peripheral speeds.

The lever 97 is provided with a projection 137 directly opposite the lug 101, which extends through a suitable aperture 138 in the base 87 and bottom 2 of the printing member, into the interior of the shell 1. A pawl 139 is pivotally mounted on the side of the shell 1, above the aperture 138, and normally urged by the spring 140 away from said aperture, the movement thereof being limited by a pin 141. A lever 142 is pivotally mounted on the side of the shell 1, and is normally urged by the spring 143 to shift the pawl 139 against the action of the spring 140. The opposite end of the lever 142 is provided with a shoulder 144, which is adapted to be engaged by the shoulder 44 on the rod 43, for shifting the lever 142 against the action of the spring 143 when the bolt 38 is held depressed. The pivot 145 of the lever 142, is located so as to provide the proper movement of the lever to cause it to accomplish its purpose. This mechanism is arranged so that as the printing member enters its locked position, after having made the last impression for which it was set, and the projection 137 is thereby withdrawn, through the engagement of the lug 101 with the arm 103, the pawl 139 is shifted over the aperture 138 because of the upward movement of the shoulder 44, thereby releasing the shoulder 144.

All of the parts surrounding the printing member, that are in any way detachable from the supporting frame or platform of the machine are secured against being tampered with without being detected by means of seals 146. These seals are of the usual type, having a wire 147 threaded through the bolt or screw that holds the part to the base, and are placed thereon after the parts have all been properly placed and the entire machine inspected by the proper authorities.

Figure 3:
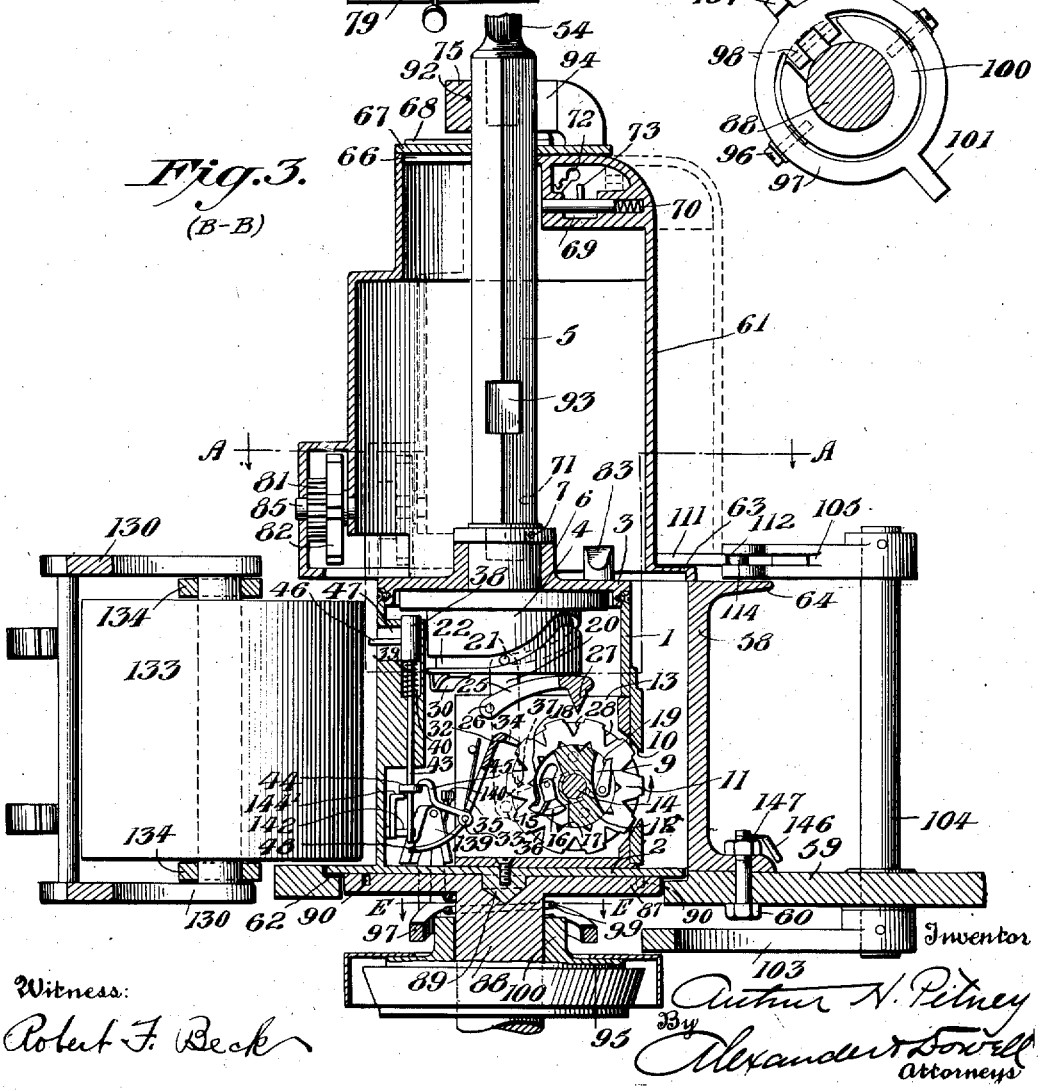
Fig. 3 is a sectional elevation of the device taken on the line B—B of Fig. 1.
Figure 6:
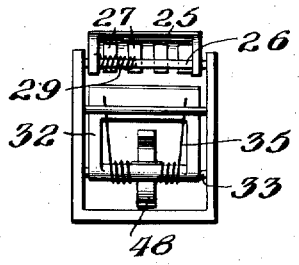
Fig. 6 is a rear elevation of the number printing machine, some of the parts in the front being omitted for the sake of clearness.
Figure 7:
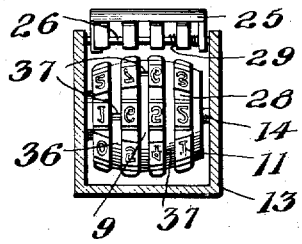
Fig. 7 is a front elevation of the same.
Figure 8:
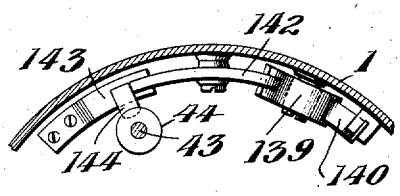
Fig. 8 is an enlarged fragmentary plan view of the printing member showing the arrangement of a part of the locking mechanism.
Figure 9:
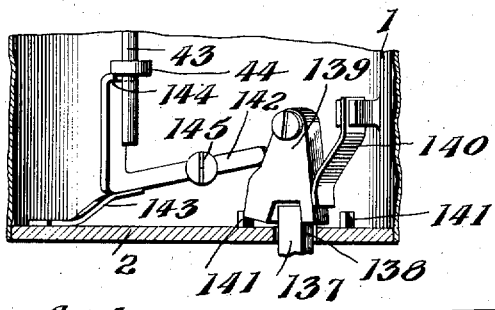
Fig. 9 is the same in elevation.
Figure 10:
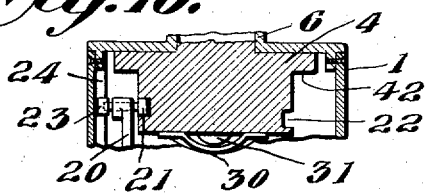
Figs. 10 and 11 are details of the enlarged head on which the printing drum is rotatably suspended.
Figure 12:
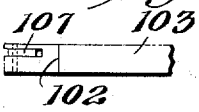
Figs. 12 and 13 are details of the engaging end of the arm which stops the rotation of the printing drum.
Figure 11:
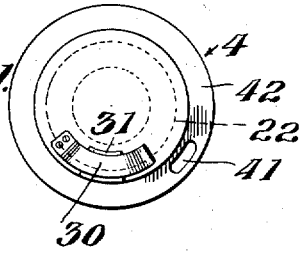
Figure 13:
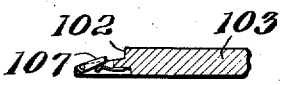

The operation of the device shown is as follows:

Assume that the printing member has been removed from the machine and is locked within the hood 61, and that it is necessary for the numbering machine to be reset before the member is capable of being used. The printing member, locked within the hood 61, is taken to the proper official who inserts a master key to unlock the printing member. The printing member may then be shifted out of the hood 61 so as to be exposed. The pin 46 is depressed, which withdraws the bolt 38 from the notch 41. The depressing of the bolt 38 moves the rod 43 downwardly, and causes the shoulder 44 to pass below the detent 45, and also causes the lower end of the rod to engage the extension 48 and shift the prongs 34 of the pawl 32 out of the notches 37 in the disks 36. The bolt 38 is held depressed until the numbering machine is reset. The numbering wheels are then turned so as to make the numbering machine register the number of impressions that are ordered and paid for. As soon as the wheels 11 are set, the bolt 38 may be released whereupon it will be held in the position in which it is shown in Fig. 3, through the engagement of the shoulder 44 by the detent 45. The printing member is then shifted back into the hood 61, and automatically locked therein when the notch 71 comes into position to permit the engagement therewith of the bolt 69, whereupon the part is returned to the user.

When the printing member is to be inserted into the machine, the shaft 5 is first set into the notch 92 by passing the reduced portion of the shaft, formed by the grooves 93, through the opening 94, and allowing the hood 61 to rest upon the housing 58. The key 74 is then shifted to cause it to enter the keyhole 72, and is turned to unlock the printing member, whereupon it may be lowered into the housing 58. In lowering the printing member it is necessary to shift the platen roller 133 away from the path of the envelops to allow the flange 62 to pass by. In its lowered position, the printing member is set upon the base 87, so that the stud 89 and the pins 90 register with their respective notches. The hood 61 is then shifted rearwardly out of the path of the envelops, which shifting causes the edges of the flange 63 to engage the shoulders 65 whereby the hood and printing member are locked in their relative positions. The machine is then ready for operation.

After an envelop is fed through the rollers 127 and 128 it enters in between the guide plates 118 and 119 and is engaged by the rollers 123 and 124 which continue its movement. In passing the rollers 123 and 124, the part 110 of the finger 108 is forced out of the path of the envelop. The swinging of the finger 108 is transmitted by the link 111 to the arm 105 which partially turns the shaft 104, and thereby swings the arm 103 so as to withdraw the end thereof from engagement with the lug 101. As soon as the lever 103 disengages the lug 101, the continued movement of the finger 108 causes the shoulders 115 and 116 to shift the link 111 against the spring 113, and disengages the shoulder 112 from the pin 114 and allows the spring 106 to shift the arm 103 back into the path of the lug 101. The disengagement of the lug 101 from the arm 103, permits the spring 99 to shift the clutch member 95 into engagement with the rotating clutch member (not shown), which causes the printing member to revolve. As the arm 103 is swung outwardly to disengage the lug 101, the bell-crank lever 120 is shifted so as to bring the shoulder 122 into the path of the lug 101, which would stop the rotation of the printing member should the arm 103 not return to its normal position.

As the printing member begins its rotation, the die 8 and row of numbers on the numbering wheels 11, are inked in passing the inking roller 49, the surface of which is constantly supplied with an even coating of ink through coöperation of the idler roller 50 and rotating swabs 51. As the printing surface approaches the printing position, the pawl 25 is depressed by the spring 30, so that the wedge shaped prongs 27 enter the notches 28 and aline the numbers on the numbering wheels 11, and the spring 30 remains in engagement with the pawl 25 during the time the printing surface is passing the printing position, whereby the numbering wheels are secured against being shifted accidentally or maliciously when they are exposed at the printing position. The peripheral speed of the rotating member and the linear travel of the envelop are equal, so that the lower advancing corner of the envelop receives an unblurred impression of the printing surface.

As the printing member continues its rotation, and the printing surface passes away from the printing position, the pawl 25 recedes from the spring 30 and allows the spring 29 to shift it to cause the disengagement of the prongs 27 from the notches 28. During this continued rotation of the printing member, the roller 21, traveling in the stationary cam slot 22, causes the arm 20 to suddenly elevate the lever 15, thereby bringing the pawl 16 into engagement with the successive notch 17, and causes the numbering wheels 11 to be turned a tenth of a revolution as the lever is gradually urged downwardly through the action of the roller 21, traveling down the gradually inclined portion of the cam slot 22. Shifting of the numbering wheels 11 decreases the count by one.

The shifting of the numbering wheels is completed just before the printing member has completed a revolution, and, as the revolution is completed, the lug 101 rides up the inclined end of the arm 103 and strikes against the shoulder 102, thereby causing the lever 97 to elevate the clutch member 95 and disengage it from the other clutch member, and also instantly stops further rotation of the printing member. The printing member is thus allowed to make but one revolution, and is held stationary until a succeeding envelop engages the finger 108, whereupon the cycle of operation is repeated.

As the envelops continue to pass through the machine the printing member is released and impresses the mark upon each one until the numbering machine has been operated so as to decrease its count from the number, at which it was originally set, to zero. Each time the impression is made upon an envelop, the shoulder 83 engages the star wheels 82 and operates the register 76 to successively register the impressions.

As the printing member recedes from the printing position, after having made the last impression, the numbering wheels are, of course, shifted in the usual manner, which causes all of them to register zero at the opening 10. As the movement of the numbering wheels to the zero position is completed, which occurs just before the printing member completes its revolution, the notches 37 in the disks 36 are shifted into the same relative position as the prongs 34 on the pawl 32, whereby the prongs 34 entering the notches shift the pawl 32, to cause the disengagement of the detent 45 from the shoulder 44 on the rod 43. The release of the rod 43 allows the spring 40 to urge the bolt 38 against the flange 42 on the head 4, and enter the notch 41 at substantially the same instant that the lug 101 engages the inclined end of the arm 103. Engagement of the prongs 34 with the notches 37, and the bolt 38 with the notch 41, respectively locks the numbering wheels against further operation and locks the printing member against further rotation.

The shifting of the rod 43 causes the shoulder 44 to recede from the shoulder 144 on the lever 142, and allows the spring 143 to shift the lever to move the pawl 139 against the action of the spring 140 and cover the recess 138 in the bottom 2 of the printing member, the projection 137 having been withdrawn through the engagement of the lug 101 with the inclined end of the arm 103. If envelops should continue to be fed through the machine after the locking of the printing member, the arm 103 would, of course, be shifted through the action of the finger 108, but the lever 97 would be held against shifting, to permit the engagement of the clutch 95 with the rotating clutch member, because of the abutting of the projection 137 against the end of the pawl 139. There would, therefore, be no strain directed against the printing member upon the release of the lug 101 from the arm 103. Before the printing member can be used again, it is necessary to remove it from the machine and send it to the proper official for resetting.

In order to remove the printing member, the hood 61 is first shifted to a position concentric with the printing member, whereupon the edges of the flange 63 are disengaged from the shoulders 65. The printing member is then shifted into the hood 61, the platen roller 133 being shifted to permit the flange 62 to pass. When the printing member is entirely within the hood 61, so that the flange 62 closes the bottom of the hood, the notch 71 comes into position to permit the bolt 69 to engage it, whereby the printing member is locked within the hood. The shifting of the printing member into the hood also brings the grooves 93 into registration with the notch 94 in the bar 75, so as to permit the removal of the shaft from said bar. The printing member is then taken to the proper official and reset in the manner hereinbefore described.

The denomination of the printing member may be changed at any time, by the proper official, by simply replacing the plate or die 8 bearing the desired insignia. It is also possible to interchangeably use several printing members on the same machine, either by substituting printing members bearing dies of different denominations, or by substituting another printing member when the impressions on the one have been all run off.

Although but one specific embodiment of this invention has been herein shown and described, it will be understood that numerous details of the construction shown may be altered or omitted without departing from the spirit of this invention as defined by the following claims.

I claim:

1. In a mail marking machine, the combination of means arranged to feed mail matter along a certain path, a rotary printing drum located adjacent to said path in position to mark said mail matter, said printing drum being adapted to be removed from said position, and a casing mounted adjacent to said drum and adapted to inclose said drum through the act of removing it from said machine.

2. In a mail marking machine, the combination of means arranged to feed mail matter along a certain path, a rotary printing drum located adjacent to said path in position to mark said mail matter, said printing drum being adapted to be removed from said position, a casing mounted adjacent to said drum and adapted to inclose said drum through the act of removing it from said machine, and means for locking said drum against displacement from said first mentioned position.

3. In a mail marking machine, the combination of means arranged to feed mail matter along a certain path, a rotary printing drum located adjacent to said path in position to mark said mail matter, said printing drum being adapted to be removed from said position, a casing mounted adjacent to said drum and adapted to inclose said drum through the act of removing it from said machine, and means adapted to lock said drum in said casing.

4. In a mail marking machine, the combination of means arranged to feed mail matter along a certain path, a rotary printing drum located adjacent to said path in position to mark said mail matter, said printing drum being adapted to be removed from said position, a casing mounted adjacent to said drum and adapted to inclose said drum through the act of removing it from said machine, and means adapted to automatically lock said drum in said casing when said head is shifted from said position into said casing.

5. In a mail marking machine, the combination of means arranged to feed mail matter along a certain path, a rotary printing drum located adjacent to said path in position to mark said mail matter, said printing drum being adapted to be removed from said position, a casing mounted adjacent to said drum and adapted to inclose said drum through the act of removing it from said machine, means adapted to lock said drum in said casing, and mechanism for retracting said locking means to permit said drum to be removed from said casing.

6. In a mail marking machine, the combination of means arranged to feed mail matter along a certain path, a rotary printing drum located adjacent to said path in position for marking the mail matter, a housing for said drum when in its printing position, said drum being adapted to be removed from said housing, and a hood adapted to form a part of said housing when said drum is in its printing position and being also adapted to receive and inclose said drum when it is removed from its printing position.

7. In a mail marking machine, the combination of means arranged to feed mail matter along a certain path, a rotary printing drum located adjacent to said path in position for marking the mail matter, a housing for said drum when in its printing position, said drum being adapted to be removed from said housing, a hood adapted to form a part of said housing when said drum is in its printing position and being also adapted to receive and inclose said drum when it is removed from its printing position, and means movable with said drum and adapted to form a closure for the bottom of said hood when said drum is shifted into said hood.

8. In a mail marking machine, the combination of means arranged to feed mail matter along a certain path, a rotary printing drum located adjacent to said path in position for marking the mail matter, a housing for said drum when in its printing position, said drum being adapted to be removed from said housing, a hood adapted to form a part of said housing when said drum is in its printing position and being also adapted to receive and inclose said drum when it is removed from its printing position, and a transversely disposed annular flange on said drum adapted to form a closure for the bottom of said hood when said drum is shifted into said hood.

9. In a mail marking machine, the combination of means arranged to feed mail matter along a certain path, a rotary printing drum located adjacent to said path in position for marking the mail matter, a housing for said drum when in its printing position, said drum being adapted to be removed from said housing, and a hood adapted to form a part of said housing when said drum is in its printing position and being also adapted to receive and inclose said drum when it is removed from its printing position, said drum and hood being relatively movable in a transverse direction for the purpose of removing said hood clear of the path of the mail matter.

10. In a mail marking machine, the combination of means arranged to feed mail matter along a certain path, a rotary printing drum located adjacent to said path in position for marking the mail matter, a housing for said drum when in its printing position, said drum being adapted to be removed from said housing, a hood adapted to form a part of said housing when said drum is in its printing position and being also adapted to receive and inclose said drum when it is removed from its printing position, said drum and hood being relatively movable in a transverse direction for the purpose of removing said hood clear of the path of the mail matter, and means adapted to lock said drum within said housing through the relative transverse shifting of said drum and hood.

11. In a mail marking machine, the combination of means arranged to feed mail matter along a certain path, a rotary printing drum located adjacent to said path in position for marking the mail matter, a housing for said drum when in its printing position, said drum being adapted to be removed from said housing, a hood adapted to receive said drum when removed from said housing, said hood being adapted to rest upon said housing and form a closure therefor when said drum is in its printing position, said hood being adapted to be shifted transversely of said drum for the purpose of removing it from the path of the mail matter, and coacting shoulders on said housing and hood adapted to have interlocking engagement when said hood is thus shifted, whereby said drum is locked against shifting from its printing position.

12. In a mail marking machine, the combination of means arranged to feed mail matter along a certain path, a rotary printing drum located adjacent to said path in position for marking the mail matter, a housing for said drum when in its printing position, said drum being adapted to be removed from said housing, a hood adapted to receive said drum when removed from said housing, said hood being adapted to be supported upon said housing and to form a closure therefor when said drum is in its printing position, and means adapted to hold said drum and hood in their respective positions when said drum is shifted out of said hood into said printing position, said means being adapted to permt said hood and drum to be removed from said machine when said drum is shifted into said hood.

13. In a mail marking machine, the combination of a frame, a plurality of rollers arranged to feed envelops along a certain path, a shaft, a printing drum rotatably mounted on said shaft, means adapted to support said shaft in a vertically disposed position on said frame so as to permit said drum to be moved into and out of position for marking said envelops, driving mechanism for rotating said drum when in position for marking said envelops, and a hood carried on said shaft adapted to receive said drum when shifted out of said printing position.

14. In a mail marking machine, the combination of a frame, a plurality of rollers arranged to feed envelops along a certain path, a shaft, a printing drum rotatably mounted on said shaft, means adapted to support said shaft in a vertically disposed position on said frame so as to permit said drum to be moved into and out of position for marking said envelops, driving mechanism for rotating said drum when in position for marking said envelops, a hood carried on said shaft adapted to receive said drum when shifted out of said printing position, and means located within said hood and adapted to lock said drum in said hood.

15. In a mail marking machine, the combination of a frame, a plurality of rollers arranged to feed envelops along a certain path, a shaft, a printing drum rotatably mounted on said shaft, means adapted to support said shaft in a vertically disposed position on said frame so as to permit said drum to be moved into and out of position for marking said envelops, driving mechanism for rotating said drum when in position for marking said envelops, a hood carried on said shaft adapted to receive said drum when shifted out of said printing position, means located within said hood and adapted to lock said drum in said hood, said locking means comprising a bolt mounted on said hood, a shoulder carried by said drum, and means normally urging said bolt to engage said shoulder when said drum is shifted into said hood.

16. In a mail marking machine, the combination of a frame, a plurality of rollers arranged to feed envelops along a certain path, a shaft, a printing drum rotatably mounted on said shaft, means adapted to support said shaft in a vertically disposed position on said frame so as to permit said drum to be moved into and out of position for marking said envelops, driving mechanism for rotating said drum when in position for marking said envelops, a hood carried on said shaft adapted to receive said drum when shifted out of said printing position, means located within said hood and adapted to lock said drum in said hood, said locking means comprising a bolt mounted on said hood, a shoulder carried by said drum, means normally urging said bolt to engage said shoulder when said drum is shifted into said hood, and means adapted to be inserted into said hood from the exterior and to be operated to retract said bolt for causing it to be disengaged from said shoulder whereby said drum is released from said hood.

17. In a mail marking machine, the combination of a frame, a plurality of rollers arranged to feed envelops along a certain path, a shaft, a printing drum rotatably mounted on said shaft, a bar supported on said frame and recessed to receive said shaft, said shaft being shiftable in said recess for moving said drum into position for marking said envelops, driving mechanism adapted to engage and rotate said drum when shifted into said printing position, and integral coacting shoulders on said bar and shaft adapted to have interlocking engagement for securing said shaft and drum against dislodgment.

18. In a mail marking machine, the combination of a frame, a plurality of rollers arranged to feed envelops along a certain path, a shaft of polygonal cross-section, a printing drum rotatably mounted on said shaft, and a bar supported on said frame, said bar having an aperture formed therein of size and shape substantially like said shaft and having a notch leading into said aperture, said shaft being recessed whereby it is adapted to be shifted into said aperture when said drum is out of said printing position.

19. In a mail marking machine the combination of a frame, means on said frame for conveying mail matter along a certain path, a movable printing member located on said frame at one side of said path, a series of numbering wheels mounted on said member and movable into and out of position for printing on mail matter moving along said path, mechanism adapted through the movement of said printing member to automatically change the count of said numbering wheels when said numbering wheels are shifted away from the printing position, means adapted to lock said numbering wheels so as to prevent a change in the count thereof while said numbering wheels are in the printing position, and a housing located entirely on one side of said path and entirely surrounding said printing member except for one or more openings therein adjacent to said path.

20. In a machine of the class described, the combination of a frame, means on said frame for conveying mail matter along a certain path, a rotary printing member located on said frame at one side of said path and having a cylindrical printing surface concentric with the axis of said member, a series of numbering wheels mounted on said member and having printing surfaces conforming with the printing surface of said member, means for rotating said printing member so as to move said printing surface thereof and of said numbering wheels into and out of position for printing on mail matter moving along said path, mechanism for automatically changing the count of said numbering wheels during a part of the rotation when said numbering wheels are away from said printing position, means for locking said numbering wheels against changing of their count when they are in the part of their path which is adjacent to said printing position, and a housing located entirely on one side of said path and entirely surrounding said printing member except for one or more openings therein adjacent to said path.

21. In a device of the class described, the combination of a rotary printing member, a series of numbering wheels mounted on said printing member and having printing surfaces shaped to substantially coincide, when in the printing position, with a cylinder concentric to the axis of said printing member, mechanism for operating said numbering wheels to change the count thereof during a certain angular interval of the rotation of said member, locking means adapted to prevent such operation of said numbering wheels during another angular interval of the rotation of said member, and a housing partly surrounding said printing member and adapted to cover said numbering wheels throughout that part of the rotation of said printing member during which said numbering wheels are free from said locking means.

22. In a device of the class described, the combination of a printing member having a printing surface and being movable into and out of the printing position, a series of numbering wheels having the printing surfaces of the numerals coinciding with the printing surface of said member and movable with said member into and out of the printing position, mechanism automatically actuating said numbering wheels at each movement of said member away from the printing position, the numerals on each of said wheels being arranged so as to move into the printing position in the inverse order of their denomination whereby the count of said numbering wheels is gradually reduced by unity, and means coacting with the numbering wheel of lowest order and controlled by those of higher order so as to automatically lock said printing member against further operation after the count of said numbering wheels has been reduced to unity.

23. In a mail marking machine, the combination of a vertically disposed shaft, a head carried on said shaft, a member rotatably mounted on said shaft and depending below said head and having a printing surface concentric with said shaft, a plurality of numbering wheels mounted in said member and provided with printing surfaces conforming with the printing surface on said member, means for rotating said member, mechanism operated by the rotation of said member and adapted to change the count of said numbering wheels during a part of each revolution of said member, a bolt slidably mounted on said member, a stop on said head, means normally urging said bolt into a position to engage said stop, means adapted to hold said bolt in a retracted position, and mechanism engaging the peripheries of said numbering wheels and adapted to release said retracting means when said numbering wheels register a certain predetermined number, whereby said bolt will be released to engage said shoulder and prevent further operation of said member.

24. In a mail marking machine, the combination of a vertically disposed shaft, a head carried on said shaft, a member rotatably mounted on said shaft and depending below said head and having a printing surface concentric with said shaft, a plurality of numbering wheels mounted in said member and provided with printing surfaces conforming with the printing surface on said member, means for rotating said member, mechanism operated by the rotation of said member and adapted to change the count of said numbering wheels during a part of each revolution of said member, a vertically disposed bolt slidably mounted in said member under said head, a stop on said head, means normally urging said bolt into a position to engage said stop, a pawl having a plurality of prongs corresponding in number to the number of said numbering wheels, means normally urging said pawl to cause said prongs to bear upon the peripheries of the respective numbering wheels, a shoulder on said bolt, and a detent carried by said pawl and adapted to engage said shoulder when said prongs are riding on the peripheries of said wheels for holding said bolt in a retracted position, each of said numbering wheels having a recess in the periphery thereof, said recesses being relatively arranged in said wheels so that when said numbering wheels indicate a certain predetermined number, said recesses will register with said prongs, whereby said prongs will simultaneously enter said recesses to permit said pawl to be shifted so as to cause said detent to disengage said shoulder.

25. The combination of a shaft, a printing member rotatably mounted on said shaft and having the printing surface concentric with the axis thereof, a plurality of numbering wheels mounted on said member and provided with printing surfaces conforming with the printing surface on said member, said printing wheels having notches formed in the peripheries thereof, means for rotating said member, mechanism operated by the rotation of said member and acting to shift said numbering wheels for changing the count thereof, a pawl having shoulders thereon corresponding to the notches formed in said numbering wheels, and a cam carried by said shaft and engaging said pawl during a certain angular movement of said printing member so as to shift said shoulders into said notches for the purpose of locking said numbering wheels against rotation in either direction during the movement of said numbering wheels past the printing position.

26. The combination of a printing member rotatably mounted and having a printing surface thereon concentric with the axis thereof, a plurality of numbering wheels mounted on said member and being provided with printing surfaces conforming with the printing surface on said member, means for rotating said member, mechanism operated by the rotation of said member and adapted to shift said numbering wheels for changing the count thereof during a part of the rotation of said member when said wheels are away from the printing position, said numbering wheels having notches therein, a pawl adapted to be shifted to engage said notches for alining the printing surfaces of said wheels, and means for shifting said pawl and adapted to hold said pawl in engagement with said notches during the movement of said printing surfaces past the printing position.

27. In a mail marking machine, the combination of a printing member rotatably mounted and having a cylindrical printing surface, a plurality of numbering wheels mounted in said member and provided with printing surfaces conforming to the printing surface on said member, a rotatable base adapted to support said member, a shiftable clutch member, a lever pivotally connected to said base and also to said clutch member, means normally urging said clutch member toward its engaging position, an arm normally shifted into position to engage said lever for shifting it to retract said clutch member, mechanism connected to said arm and adapted to be actuated to shift the same to release said clutch member, said base member having an aperture therein, a projection on said lever adapted to extend through said aperture when said clutch member is in engaging position, and to be retracted when said clutch member is shifted out of engaged position, mechanism for locking said member against rotation when said numbering wheels indicate a certain predetermined number, and means within said printing member controlled by said last mentioned mechanism and adapted to cover said aperture and engage said projection for holding said clutch member out of engaged position.

28. In a mail marking machine, the combination of a printing member rotatably mounted and having a cylindrical printing surface, a plurality of numbering wheels mounted in said member and provided with printing surfaces conforming to the printing surface on said member, a rotatable base adapted to support said member, a shiftable clutch member, a lever pivotally connected to said base and also to said clutch member, means normally urging said clutch member toward its engaging position, an arm normally shifted into position for shifting said lever to retract said clutch member, mechanism connected to said arm and adapted to shift the same to release said clutch member, said base member having an aperture therein, a projection on said lever adapted to extend through said aperture when said clutch member is in engaging position, and to be retracted when said clutch member is shifted out of engaged position, mechanism for locking said member against rotation when said numbering wheels indicate a certain predetermined number, a detent pivotally mounted on said member adjacent to said aperture and normally urged away from said aperture, and a lever normally urging said detent toward a position for obstructing said aperture, said lever being normally held in a retracted position by said locking mechanism when said locking mechanism is in position for permitting the rotation of said member, and being adapted to be released when said locking mechanism is shifted for locking said member.

29. In a mail marking machine the combination of a printing drum, feeding mechanism for carrying mail matter past said drum in position to receive impressions from said drum, numbering wheels carried by said drum, and a casing located entirely on one side of the path of said mail matter and entirely surrounding said drum except for one or more openings therein adjacent to said path, said casing being removable with said drum from said feeding mechanism, and being arranged to normally prevent resetting of said numbering wheels both when said drum is in the machine and when removed therefrom.

30. A device of the class described comprising a rotatable casing, a printing unit within said casing comprising adjustable type carriers, mechanism for adjusting said type carriers, a housing having an opening therein and surrounding said casing, means for normally locking said type carriers against adjustment when exposed through the opening in said housing, said type carriers being free to be adjusted when not exposed through said opening.

31. A device of the class described, comprising a printing mechanism including a plurality of adjustable type carriers and operating mechanism therefor, a notched member rigid with each type carrier, a pawl adapted to engage the notches in said members when the type carriers arrive at some predetermined position, said pawl having connections to lock said operating mechanism when said pawl is engaging said notches.

32. In a device of the class described, printing mechanism including a plurality of adjustable type carriers, means for effecting impressions from the type carriers, a pawl coöperating with said type carriers and arranged to lock the type carriers after a predetermined number of impressions, a pivoted cam arm coöperating with said pawl, and a spring actuated locking device for said means, said cam arm being arranged to control said spring actuated locking device to permit locking action of the latter when the type carriers are locked.

33. In a mail marking machine the combination of a printing member comprising numbering wheels; mechanism for directing mail matter past said member to receive impressions therefrom, said printing member being bodily removable from and replaceable in said machine; and automatically operable means to prevent unauthorized resetting of said numbering wheels both when said printing member is in the machine and when it is removed therefrom.

34. In a mail marking machine the combination of an impression member; a printing member having numeral wheels coöperating with said impression member; mechanism for directing mail matter between the impression and printing members to receive impressions from the numeral wheels; said printing member and numeral wheels being together bodily removable from and replaceable in operative position; and automatically operable means to prevent unauthorized resetting of said numeral wheels both when they are in the machine and when they are removed therefrom.

35. In a mail marking machine the combination of a printing drum; feeding mechanism for carrying mail matter past said drum in position to receive impressions therefrom; numbering wheels operatively connected with said drum, and removable with said drum from and replaceable with said drum in operative position adjacent said feeding mechanism; and automatically operable means to prevent unauthorized resetting of said numbering wheels both when said drum is in the machine and when removed therefrom.

36. In a mail marking machine the combination of a printing member comprising numbering wheels; mechanism for directing mail matter past said member to receive impressions therefrom, said printing member being bodily removable from and replaceable in said machine; mechanism for locking said numbering wheels when they have reached a predetermined amount; and automatically operable means adapted to prevent unauthorized resetting of said numbering wheels both when said printing member is in the machine, and when it is removed therefrom.

37. In a mail marking machine the combination of an impression member; a printing member having numeral wheels coöperating with said impression member; mechanism for directing mail matter between the impression and printing members to receive impressions from the numeral wheels; said printing member and numeral wheels being together bodily removable from and replaceable in operative position; mechanism for locking said numeral wheels when they have reached a predetermined amount; and automatically operable means to prevent unauthorized resetting of said numeral wheels both when they are in the machine and when they are removed therefrom.

38. In a mail marking machine the combination of a printing drum; feeding mechanism for carrying mail matter past said drum in position to receive impressions from said drum; numbering mechanism connected with said drum; a casing carrying said drum and numbering mechanism; said casing being bodily removable from and replaceable in said machine; and automatically operable means to prevent unauthorized resetting of said numbering mechanism both when said casing is in the machine and when it is removed therefrom.

39. In a mail marking machine the combination of a printing member comprising numbering wheels; mechanism for directing mail matter past said member to receive impressions therefrom; said printing member being bodily removable from and replaceable in said machine; and means adapted to prevent shifting of said numbering wheels when said printing member is removed from the machine; said numbering wheels being released when the printing member is in operative position in the machine.

40. In a mail marking machine the combination of an impression member; a printing member having numeral wheels coöperating with said impression member; mechanism for directing mail matter between the impression and printing members to receive impressions from the numeral wheels; said printing member and numeral wheels being together bodily removable from and replaceable in operative position; and means to prevent shifting of said numeral wheels when they are removed from the machine; said wheels being released when the printing member is in operative position in the machine.

41. In a mail marking machine the combination of a printing drum; feeding mechanism for carrying mail matter past said drum in position to receive impressions therefrom; and numbering wheels operatively connected with said drum, and removable with said drum from and replaceable with said drum in said feeding mechanism; and means adapted to prevent shifting of said numbering wheels when said drum is removed from the machine; said wheels being released when the drum is in operative position in the machine.

42. In a mail marking machine, the combination of a printing member comprising numbering wheels, mechanism for directing mail matter past said member to receive impressions therefrom, said printing member being bodily removable from and replaceable in said machine, mechanism for locking said numbering wheels when they have reached a predetermined amount; and means adapted to prevent shifting of the numbering wheels when said printing member is removed from the machine; said wheels being released when the printing member is in operative position in the machine.

43. In a mail marking machine the combination of an impression member; a printing member having numeral wheels coöperating with said impression member; mechanism for directing mail matter between the impression and printing members to receive impressions from the numeral wheels; said printing member and numeral wheels being together bodily removable from and replaceable in operative position; mechanism for locking said numeral wheels when they have reached a predetermined amount; and means for preventing unauthorized resetting of said numeral wheels when they are removed from the machine; said wheels being released when the printing member and wheels are in operative position in the machine.

44. In a mail marking machine the combination of a printing drum; feeding mechanism for carrying mail matter past said drum in position to receive impressions from said drum; numbering mechanism connected with said drum; a casing carrying said drum and numbering mechanism; said casing being bodily removable from and replaceable in said machine; and means for preventing unauthorized resetting of said numbering mechanism when removed from the machine with the casing; said preventing means being disengaged when the wheels are in operative position in the machine.

45. In printing mechanism for the purpose specified, the combination of printing mechanism comprising numbering wheels; means for shifting the proper wheels at each printing operation; means adapted to automatically lock said wheels after a predetermined number of impressions have been made; said wheels operating in a descending series until each numeral wheel in proper sequence shows zero at the point of printing contact; said printing mechanism being bodily removable from and replaceable in said machine, and means automatically operable arranged to prevent unauthorized resetting of said numbering wheels both when said printing mechanism is in the machine and when it is removed therefrom.

46. In printing mechanism for the purpose specified, the combination of a set of printing numeral wheels; means for shifting the proper wheels at each printing operation; means adapted to automatically lock said set of wheels against further operation after a predetermined number of impressions have been made, said wheels operating in a descending series; a second set of numeral wheels; means for operating numeral wheels in the second set in an ascending series simultaneously with the related numeral wheels in the first set; said second set of wheels indicating the total number of impressions made by said first set of wheels, substantially as described.

47. In printing mechanism for the purpose specified, the combination of printing mechanism comprising numbering wheels; means for shifting the proper wheels at each printing operation; means adapted to automatically lock said wheels against further operation after a predetermined number of impressions have been made, said wheels operating in a descending series until each numeral wheel in proper sequence shows zero at the point of printing contact; said printing mechanism being bodily removable from and replaceable in said machine; and means for preventing unauthorized resetting of said numbering wheels when said printing mechanism is removed from the machine; said wheels being released when the printing mechanism is in operative position in the machine.

48. In printing mechanism for the purpose specified, the combination of a set of printing numeral wheels; means for shifting the proper wheel at each printing operation; means adapted to automatically lock said set of wheels against further operation after a predetermined number of impressions have been made, said wheels operating in a descending series; a second set of numeral wheels; means for operating the second numeral wheels in an ascending series in proper sequence with the first numeral wheels; said sets of wheels being bodily removable from and replaceable in said machine; and means arranged to normally prevent unauthorized resetting of said numeral wheels both when in operative position in the machine and when removed therefrom.

49. In printing mechanism for the purpose specified, the combination of a set of printing numeral wheels; means for shifting the proper wheel at each printing operation; means adapted to automatically lock said set of wheels against further operation after a predetermined number of impressions have been made, said wheels operating in a descending series; a second set of numeral wheels; means for operating numeral wheels in the second set in an ascending series in proper sequence with the first numeral wheels; said sets of wheels being bodily removable from and replaceable in said machine; and means for preventing unauthorized resetting of said sets of numeral wheels when removed from the machine; said preventing means being disengaged when the wheels are in operative position in the machine.

50. In a mail marking machine the combination of an impression member; a printing member comprising printing numeral wheels and a related die plate coöperating with said impression member; mechanism for directing mail matter between the impression and printing members to receive impressions from the die plate and numeral wheels; said printing member being bodily removable from and replaceable in operative position; and automatically operable means for preventing unauthorized resetting of said numeral wheels both when the printing member is in the machine and when it is removed therefrom.

51. In a mail marking machine the combination of a printing member comprising a die plate and a set of numbering wheels; mechanisms for directing mail matter past said member to receive impressions therefrom, said printing member being bodily removable from and replaceable in said machine; mechanism for locking said numbering wheels when they have reached a predetermined amount; and automatically operable means for preventing unauthorized resetting of said numbering wheels both when said printing member is in the machine, and when it is removed therefrom.

52. In a mail marking machine the combination of an impression member; a printing member comprising a die plate and printing numeral wheels coöperating with said impression member; mechanism for directing mail matter between the impression and printing members to receive impressions from the die plate and numeral wheels; said printing member being bodily removable from and replaceable in operative position; and means to prevent shifting of said numeral wheels when the printing member is removed from the machine; said wheels being released when the printing member is in operative position in the machine.

53. In a mail marking machine the combination of an impression member; a printing member comprising a die plate and printing numeral wheels coöperating with said impression member; mechanism for directing mail matter between the impression and printing members to receive impressions from the die and numeral wheels; said printing member being bodily removable from and replaceable in operative position; mechanism for locking said numeral wheels, when they have reached a predetermined amount; and means for preventing unauthorized resetting of said numeral wheels when they are removed from the machine; said preventing means being disengaged when the printing member is in operative position in the machine.

54. In a mail marking machine the combination of a printing member; feeding mechanism for carrying mail matter past said member in position to receive impressions therefrom; numbering mechanism connected with said printing mechanism; and a housing for carrying said printing and numbering mechanism; said housing being bodily removable from and replaceable in said machine, and key-controlled means for locking said housing.

55. In a mail marking machine the combination of a printing member; feeding mechanism for carrying mail matter past said member in position to receive impressions therefrom; numbering mechanism connected with said printing mechanism; a housing carrying said printing and numbering mechanism; said housing being bodily removable from and replaceable in said machine, and key-controlled means for locking said housing, with automatically operable means for preventing unauthorized resetting of said numbering mechanism both when it is in the machine and when it is removed therefrom.

56. In a mail marking machine the combination of a printing member; feeding mechanism for carrying mail matter past said printing member in position to receive impressions therefrom; numbering mechanism operatively connected with said printing member; a housing carrying said printing member and numbering mechanism, said housing being bodily removable from and replaceable in said machine and key controlled locking means for the housing; with means for locking said numbering mechanism, when removed from the machine with the housing; said means being disengaged when the wheels are in operative position in the machine.

57. In a machine of the character specified, means for feeding letters past a printing point; a meter bodily removable from and replaceable in the machine adjacent the printing point, said meter carrying printing means adapted to be operated when the meter is in the machine; a trip mechanism adapted to be tripped by letters passing through the machine; and means controlled by the trip mechanism for operating the printing means each time a letter passes through the machine.

58. In a machine of the character specified in claim 57, means in the meter for automatically preventing the operation of the printing means when it has made a predetermined number of revolutions.

59. In a postmark-stamping machine having means for feeding letters past a printing point; and an impression member in the machine at the printing point; of a meter bodily removable from and replaceable in the machine adjacent the printing point, said meter carrying a printer adapted to cooperate with the impression member when the meter is in the machine; a trip mechanism adapted to be actuated by the letters passing through the machine; and means controlled by the trip mechanism for operating the printer once each time a letter passes through the machine.

60. In a postmark-stamping machine as set forth in claim 59, means in the meter for automatically preventing the operation of the printer when it has made a predetermined number of revolutions.

61. In mechanism as set forth in claim 57, a registering mechanism in the meter, means for operating the registering mechanism one point for each operation of the printing means, and means for locking the registering mechanism when the printing means has made a predetermined number of operations.

62. In mechanism as set forth in claim 58, a registering mechanism in the meter, means for operating the registering mechanism one point for each operation of the printing means, and means for locking the registering mechanism when the printing means has made a predetermined number of operations.

63. In mechanism as set forth in claim 59, a registering mechanism in the meter, means for operating the registering mechanism one point for each rotation of the printer, and means for locking the registering mechanism when the printer has made a predetermined number of operations.

64. In mechanism as set forth in claim 60, a registering mechanism in the meter, means for operating the registering mechanism one point for each rotation of the printer, and means for locking the registering mechanism when the printer has made a predetermined number of operations.

65. In a machine of the character specified, means for forwarding letters past the printing point; clutch controlled driving means for operating the printing means; and a trip mechanism adapted to be operated by a letter passing through the machine for releasing the clutch to cause the printing means to operate once for each letter passing through the machine; with a removable meter adapted to be placed in the machine, said meter carrying printing means; and means for automatically operatively engaging the printing means with the clutch controlled driving means as and when the meter is properly positioned in the machine.

66. In a machine as set forth in claim 65, means in the meter for automatically preventing the operation of the printing means when it has made a predetermined number of operations.

67. In a machine of the character specified, means for forwarding letters past the printing point; impression means at the printing point; clutch controlled means for driving the printer; and a trip mechanism adapted to be operated by a letter passing through the machine for releasing the clutch to cause the printer to make one revolution for each letter passing through the machine; with a removable meter adapted to be placed in the machine adjacent the printing point, said meter carrying a printer adapted to cooperate with the impression means; and means for automatically operatively engaging the printer with the clutch controlled printer driving means as and when the meter is properly positioned in the machine.

68. In a machine as set forth in claim 67, means in the meter for automatically preventing the operation of the printer when it has made a predetermined number of revolutions.

69. In mechanism as set forth in claim 65, a registering mechanism in the meter, means for operating the registering mechanism one point for each operation of the printing means; and means for locking the registering mechanism when the printing means has made a predetermined number of operations.

70. In mechanism as set forth in claim 66, a registering mechanism in the meter, means for operating the registering mechanism one point for each operation of the printing means; and means for locking the registering mechanism when the printing means has made a predetermined number of operations.

71. In mechanism as set forth in claim 67, a registering mechanism in the meter, means for operating the registering mechanism one point for each rotation of the printer, and means for locking the registering mechanism when the printer has made a predetermined number of operations.

72. In mechanism as set forth in claim 68, a registering mechanism in the meter, means for operating the registering mechanism one point for each rotation of the printer, and means for locking the registering mechanism when the printer has made a predetermined number of operations.

73. In a machine of the character specified, means for feeding letters past a printing point; a meter bodily removable from and replaceable in the machine adjacent the printing point, said meter carrying printing means adapted to be operated when the meter is in the machine; a trip mechanism adapted to be tripped by letters passing through the machine; and means controlled by the trip mechanism for operating the printing means each time a letter passes through the machine; with means in the meter for automatically preventing the operation of the printing means when it has made a predetermined number of revolutions.

In testimony that I claim the foregoing as my own, I affix my signature.

ARTHUR H. PITNEY.